United States Patent [19]

Jansen-Herfeld

[11] Patent Number: 4,574,676

[45] Date of Patent: Mar. 11, 1986

[54] CIRCULAR SAW BLADE

[75] Inventor: Röttger Jansen-Herfeld, Remscheid, Fed. Rep. of Germany

[73] Assignee: Firma Röttger Jansen-Herfeld, Remschied, Fed. Rep. of Germany

[21] Appl. No.: 468,306

[22] Filed: Feb. 22, 1983

[30] Foreign Application Priority Data

Sep. 3, 1982 [DE] Fed. Rep. of Germany ....... 3232778

[51] Int. Cl.<sup>4</sup> ...................... B27B 33/08; B23D 61/02
[52] U.S. Cl. ........................................ 83/835; 83/837
[58] Field of Search ................ 83/835, 837, 848, 849, 83/850, 851, 852, 853, 854, 855, 666, 665

[56] References Cited

U.S. PATENT DOCUMENTS 3,981,216 9/1976 Lemmon .......................... 83/835 X

FOREIGN PATENT DOCUMENTS 964557 3/1975 Canada .................................. 83/837
2654625 8/1978 Fed. Rep. of Germany ........ 83/835

Primary Examiner—Donald R. Schran
Attorney, Agent, or Firm—Michael J. Striker

[57] ABSTRACT

A circular saw blade is formed with a plurality of strain compensating slots which include a number of inner slots extended outwardly from a central bore of the blade and a number of outer slots which are substantially parallel to the inner slots and respectively spaced therefrom in the radial direction and circumferential direction. Each outer slot partially overlaps the nearest inner slot in the radial direction. Each slot has a spiral or circular end portion.

12 Claims, 4 Drawing Figures

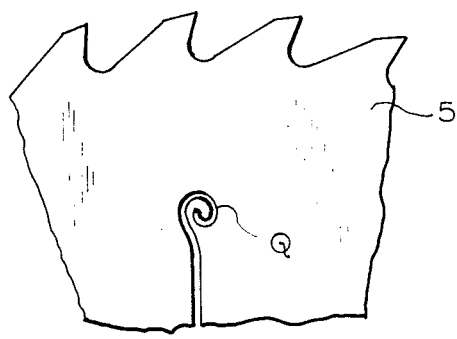
FIG. 2
FIG. 3
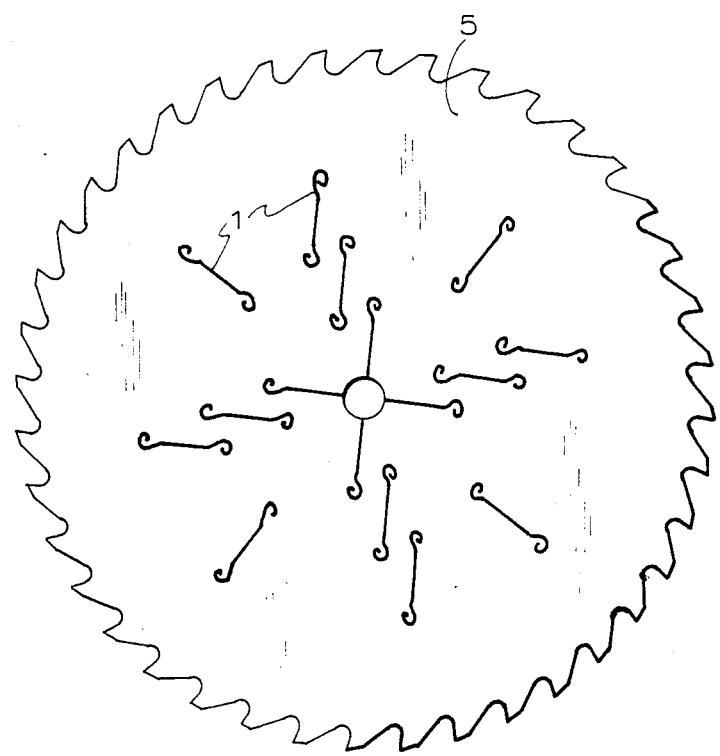
FIG. 4

CIRCULAR SAW BLADE

BACKGROUND OF THE INVENTION

The present invention pertains to a circular saw blade. More particularly, the invention pertains to a saw blade provided with strain compensating slots.

There are known circular saw blades formed with slots projecting outwardly from the central bore of the blade in order to compensate for various strains occurring in the blades due to various centrifugal forces exerted on the rotary saw blades in operation. The pattern and the width of such slots have been disclosed, for example in German application No. OS 26 54625. The known saw blade structure has the disadvantage that heat generation problem caused by friction of the blades takes place in that structure. Furthermore, various strains caused by various centrifugal forces, could not be compensated; high engine torques could not be transmitted from keyways/pinholes to the cutting teeth of the blade; and interior tensions have been required to build up in the blades by rolling.

SUMMARY OF THE INVENTION

It is an object of the present invention to provide an improved circular saw blade.

It is a further object of the invention to provide a saw blade with means which automatically compensate for various strains caused by centrifugal forces exerted on the saw blade during operation.

It is a still further object of the invention to provide a saw blade which requires no interior tensions to build up, which is capable of transmitting high engine torques, and which has no overheating problems.

These and other objects of the invention are attained by a circular saw blade, comprising a circular body with two side faces and having an outer diameter (D), a central bore with a diameter (K), a peripheral edge provided with a plurality of cutting teeth, said blade body being formed with at least three inner radial slots extended outwardly radially from said central bore and circumferentially spaced from each other and with at least three outer radial slots extended outwardly radially towards said peripheral edge and also spaced circumferentially from each other, said inner radial slots terminating at a circumference having a first diameter (B), said outer radial slots extending between a circumference having a second diameter (A) and a circumference having a third diameter (C) exceeding said first diameter, said inner and outer slots being distributed circumferentially and radially such that the outer slot partially overlaps a nearest inner slot in a radial direction to define a a radial lap therebetween and the outer slot is circumferentially spaced from the nearest inner slot to define a peripheral distance therebetween; the outer slot and the nearest inner slot in one set of two adjacent seats extending substantially parallel to each other in the region of said lap, each of said slots having a width amounted the most to 2 mm substantially along the entire length of the slot, the ratio of the length of said lap to said peripheral distance being greater than 1:1, said third diameter (C) being greater than 0.5 the sum of said outer diameter (D) and the diameter (K) of the central bore.

The inner slots and outer slots may be formed with end portions which may be circular or spiral.

Some outer slots may have tangentially extended portions.

The inner and outer slots may be uniformly distributed in the radial and circumferential directions.

The slots of the inventive saw blade are so thin than sawdust is prevented from penetrating thereinto and clogging them.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 2 is a schematic partial view of the slot formed in the saw blade and illustrating an end portion of the blade of spiral shape;

FIG. 3 is a partial sectional view on line III—III of FIG. 1; and

FIG. 4 is a schematic side view of the circular saw blade of a modified embodiment.

DETAILED DESCRIPTION OF THE PREFERRED EMBODIMENTS

Figure 1:
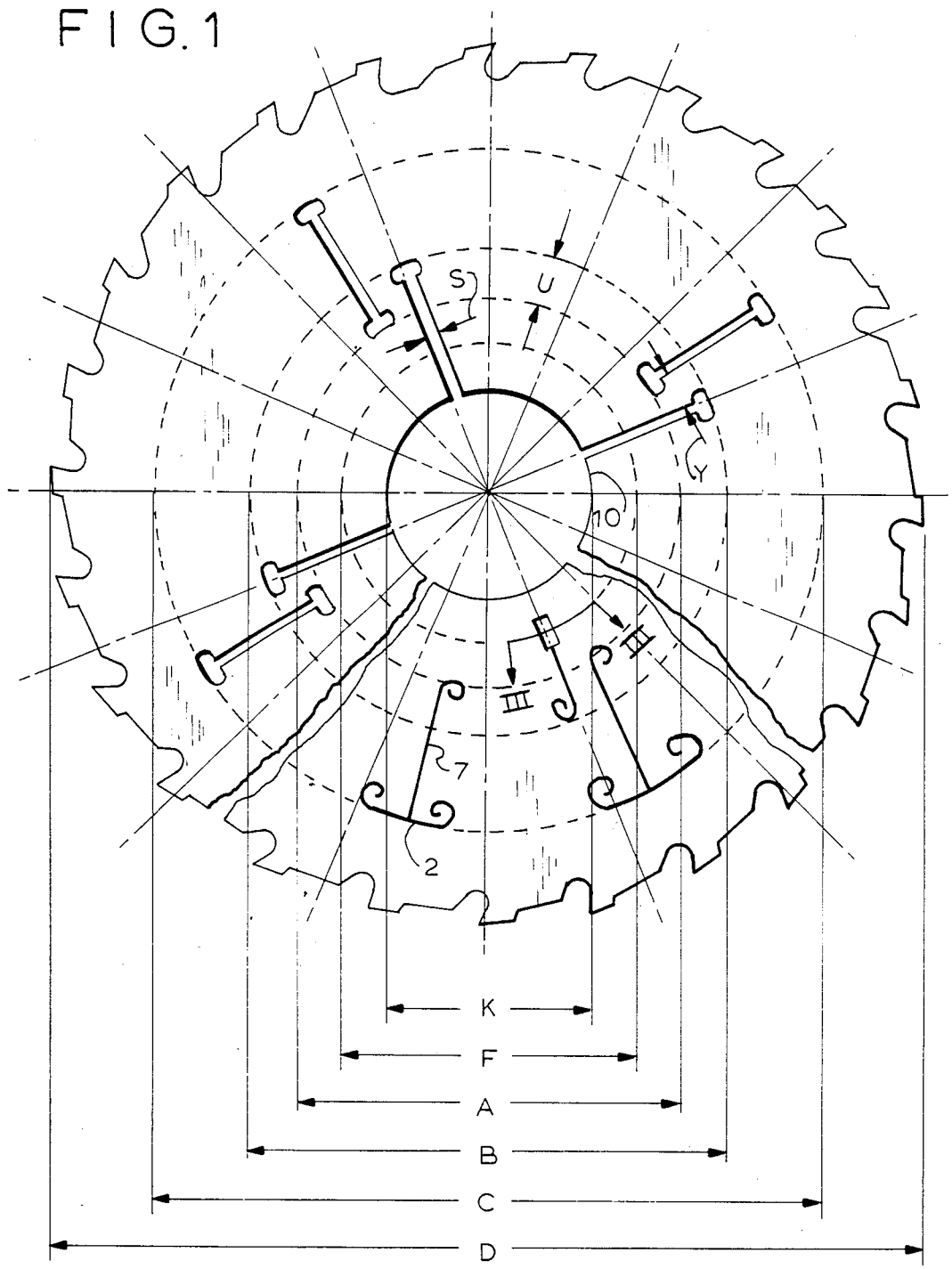
FIG. 1 is a side view of the circular saw blade according to the invention.

With reference to FIG. 1 it will be seen that a saw blade is designated as 5. The saw blade has a circular body having an axis of rotation, a peripheral edge of diameter D and two side faces. A plurality of cutting teeth are provided at the peripheral edge of the body portion. The blade body portion is formed with a central bore 10 of diameter K for the shaft known per se and not shown.

A plurality of inner radial slots 3 are formed in the saw blade. Inner slots 3 extend radially starting immediately at the central bore 10 and terminating at the diameter B. In addition, a plurality of outer radial slots 4 are provided in the blade. Slots 4 start at diameter A and end at diameter C.

Inner slots 3 and outer slots 4 are spaced from each other in the circumferential direction and are preferably distributed in pairs in the circumferential direction. As shown the inner slot 3 in each pair extends approximately parallel to the outer slot 4 and these slots partially overlap each other in the radial direction by a distance U. The outer slot in the pair is circumferentially spaced from the inner slot by a distance V. The minimum number of the inner slots suggested may be three and the number of the outer radial slots may be the same that of the inner slots or may be doubled relative to the number of the inner radial slots.

Each slot has a width S which is less than 2 mm substantially along the entire length of the slot. Wider areas in the slot width can be provided in the region of the collar of the saw blade. The collar has an outer diameter F and is shown by dotted line in FIG. 1. The fact that slots 3 and 4, which are respectively uniformly distributed in the circumferential direction of the body of the saw blade, are very thin, is important because no sawdust penetrates and thus clogs the slots, and various strains caused by centrifugal forces exerted on the rotary saw blade during operation are fully compensated by those slots.

As has been mentioned above the inner slot and outer slot in each pair extend approximately parallel to each other; this parallel extension is particularly maintained in the region of the lap portions of the slots defined by distance U.

The inner and outer slots are so distributed over the saw blade body that the distance V is always smaller than the distance U. The optimal ratio of the distance U defining the overlapped portions of two adjacent slots in the radial direction to the distance V defining the clearance between two adjacent slots in the circumferential direction is greater than 1:1.

The diameter C is more than 50% of the diameter D of the saw blade plus diameter K.

In order to reduce friction the inner slots and the outer slots can be formed, respectively, with an end portion of spiral or circular shape. FIG. 2 schematically shows an end portion Q of the slot of the spiral configuration.

Referring back to FIG. 1 a lower section 7 of the saw blade body is formed with additional outer radial slots 1 also extended between the diameters A and C similarly to the slots 4. Each slot 1, however, is provided with a tangential portion 2 projecting substantially normal to the elongation of the slot 1.

FIG. 3 shows a cross-section through the inner slot in which the edges at both opposite sides of the saw blade are ground.

It will be understood that each of the elements described above, or two or more together, may also find a useful application in other types of circular saw blades differing from the types described above.

While the invention has been illustrated and described as embodied in a circular saw blade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A circular saw blade, comprising a circular body with two side faces and having an outer diameter (D), a central bore with a diameter (K), a peripheral edge provided with a plurality of cutting teeth, said blade body being formed with at least three inner radial slots extended outwardly radially from said central bore and circumferentially spaced from each other and with at least three outer radial slots extended outwardly radially towards said peripheral edge and also spaced circumferentially from each other, said inner radial slots terminating at a circumference having a first diameter (B), said outer radial slots extending between a circumference having a second diameter (A) and a circumference having a third diameter (C) exceeding said first diameter, said inner and outer slots being distributed circumferentially and radially in sets each including one inner slot and one outer slot, the outer slot in each set partially overlapping the inner slot in the same set in a radial direction to define a radial lap (U) therebetween and the outer slot in each set being circumferentially spaced from the inner slot in the same set to define a peripheral distance (V) therebetween, each of said slots having a width of not more than 2 mm substantially along the entire length of the slot, the ratio of the length of said lap to said peripheral distance being greater than 1:1, said third diameter (C) being greater than 0.5 the sum of said outer diameter (D) and the diameter (K) of the central bore.

2. The saw blade as defined in claim 1, wherein each of the radial outer end of terminates in said inner slots an end portion.

3. The saw blade as defined in claim 2, wherein said end portion is circular.

4. The saw blade as defined in claim 2, wherein said end portion is spiral.

5. The saw blade as defined in claim 2, wherein said outer slots terminates end in portions.

6. The saw blade as defined in claim 5, wherein an end portion of the outer slot is circular.

7. The saw blade as defined in claim 5, wherein an end portion of the outer slot is spiral.

8. The saw blade as defined in claim 1, wherein at least a number of said outer slots each has a tangentially extended portion.

9. The saw blade as defined in claim 1, wherein said inner and outer slots are uniformly distributed circumferentially.

10. The saw blade as defined in claim 9, wherein the inner and outer slots are uniformly distributed in the radial directions.

11. The saw blade as defined in claim 1, wherein the number of the outer slots is doubled with respect to the number of the inner slots.

12. The saw blade as defined in claim 1, wherein said slots have ground edges at the opposite side faces of said circular body.

* * * * *